US007130899B1

(12) United States Patent
Bauer et al.

(10) Patent No.: US 7,130,899 B1
(45) Date of Patent: Oct. 31, 2006

(54) ROBUST INDICATION PROCESSING

(75) Inventors: Andreas L. Bauer, Maynard, MA (US); Gregory W. Lazar, Upton, MA (US); Walter T. Dobberpuhl, Southborough, MA (US); Sriram Krishnan, Westborough, MA (US); Timothy M. Meggison, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 708 days.

(21) Appl. No.: 10/172,615

(22) Filed: Jun. 14, 2002

(51) Int. Cl.
 *G06F 15/16* (2006.01)
(52) U.S. Cl. .................. 709/223; 709/203; 709/224; 719/316
(58) Field of Classification Search ........ 709/223–224, 709/200–203, 217–220; 370/225; 714/39; 707/102; 718/104; 719/315–316
 See application file for complete search history.

(56) References Cited

U.S. PATENT DOCUMENTS

| 5,964,837 | A * | 10/1999 | Chao et al. .................. 709/224 |
| 6,367,034 | B1 * | 4/2002 | Novik et al. .................. 714/39 |
| 6,754,664 | B1 * | 6/2004 | Bush ........................... 707/102 |
| 6,754,831 | B1 * | 6/2004 | Brownell ..................... 713/201 |
| 2001/0029544 | A1 * | 10/2001 | Cousins ....................... 709/233 |
| 2002/0049838 | A1 * | 4/2002 | Sylor et al. .................. 709/224 |

OTHER PUBLICATIONS

RFC 793—Transmission Control Protocol, pp. 5, 15, and 16.*
Stevens. "TCP/IP Illustrated". 1994. Addison-Wesly. vol. 1.*
Chapman. "Building Internet Firewalls". Jun. 2000. O'Reilly Publishing. 2nd Edition.*
Stevens. "Unix Network Programming". 1998. Prentance-Hall. 2nd Edition.*

* cited by examiner

Primary Examiner—Moustafa M. Meky
(74) Attorney, Agent, or Firm—Krishnendu Gupta; Joel Wall; Robert Kevin Perkins

(57) ABSTRACT

A technique for robust indication processing. In client server network environments running object oriented software, there is a need for monitoring the operating state or status of objects in the network. Prior monitoring schemes involved many specific and frequent inquiries or requests of multitudinous objects, for which the connections were constructed and destroyed on an as-needed basis, thereby taking an immense toll on the network's processing capacity. Subsequently, asynchronous monitoring has been employed as an improvement over the prior monitoring schemes, wherein an observer object monitors a subject object and is set at "hair-trigger" to fire back indications to an interested client if and when the subject object's state changes. Asynchronous monitoring limitations include an inability to detect client and/or server failure, insecure and unreliable connections through which indications are intended to be fired back, and other drawbacks. The technique disclosed herein for asynchronous monitoring solves these problems and others by employing a heartbeat polling scheme having virtually unique ID numbers to instantaneously determine if there has been client or server failure or recycling along with a secure or persistent pipe that interconnects client and server and has the ability to tunnel through firewalls when public networks such as the Internet are utilized.

26 Claims, 8 Drawing Sheets

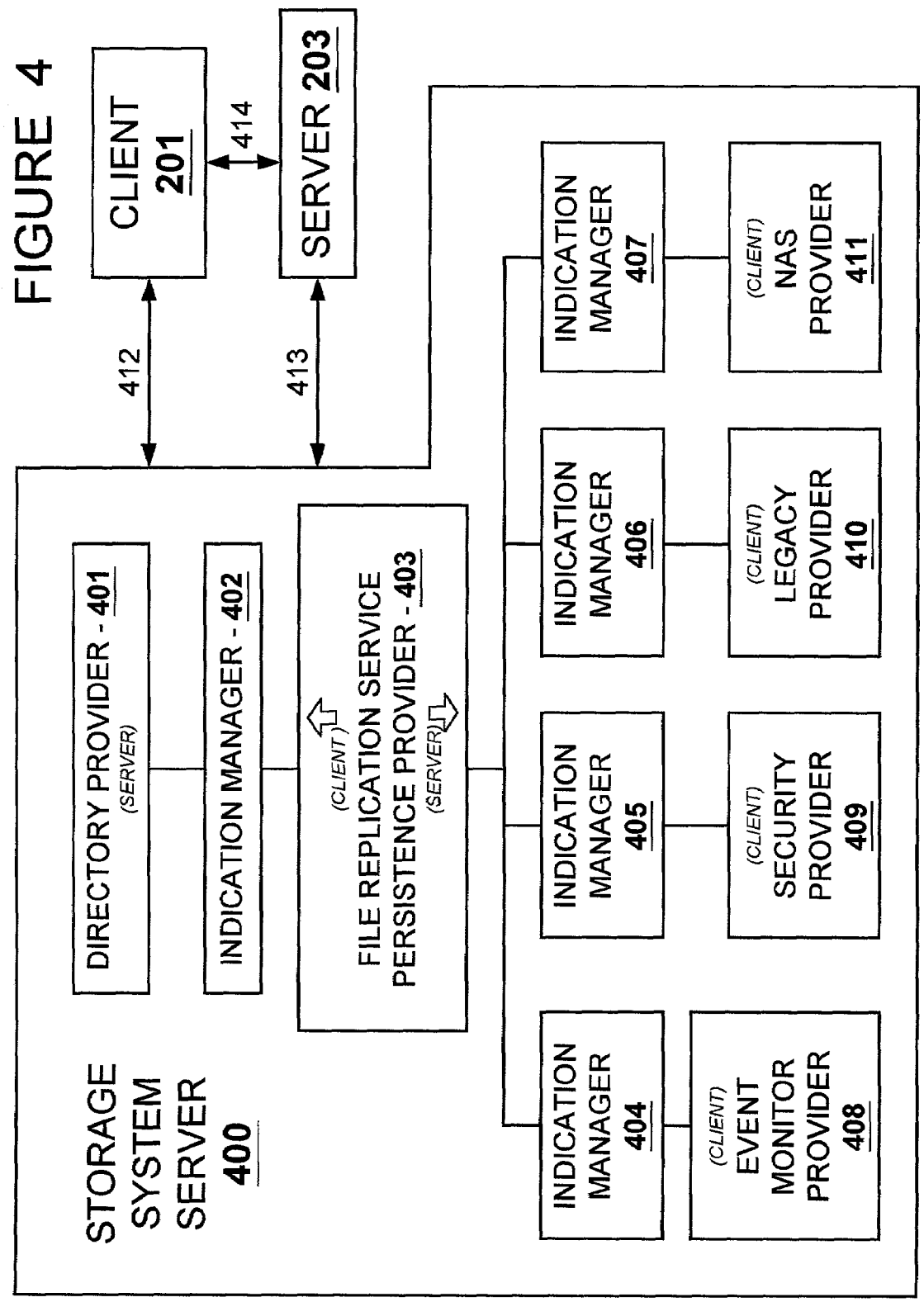

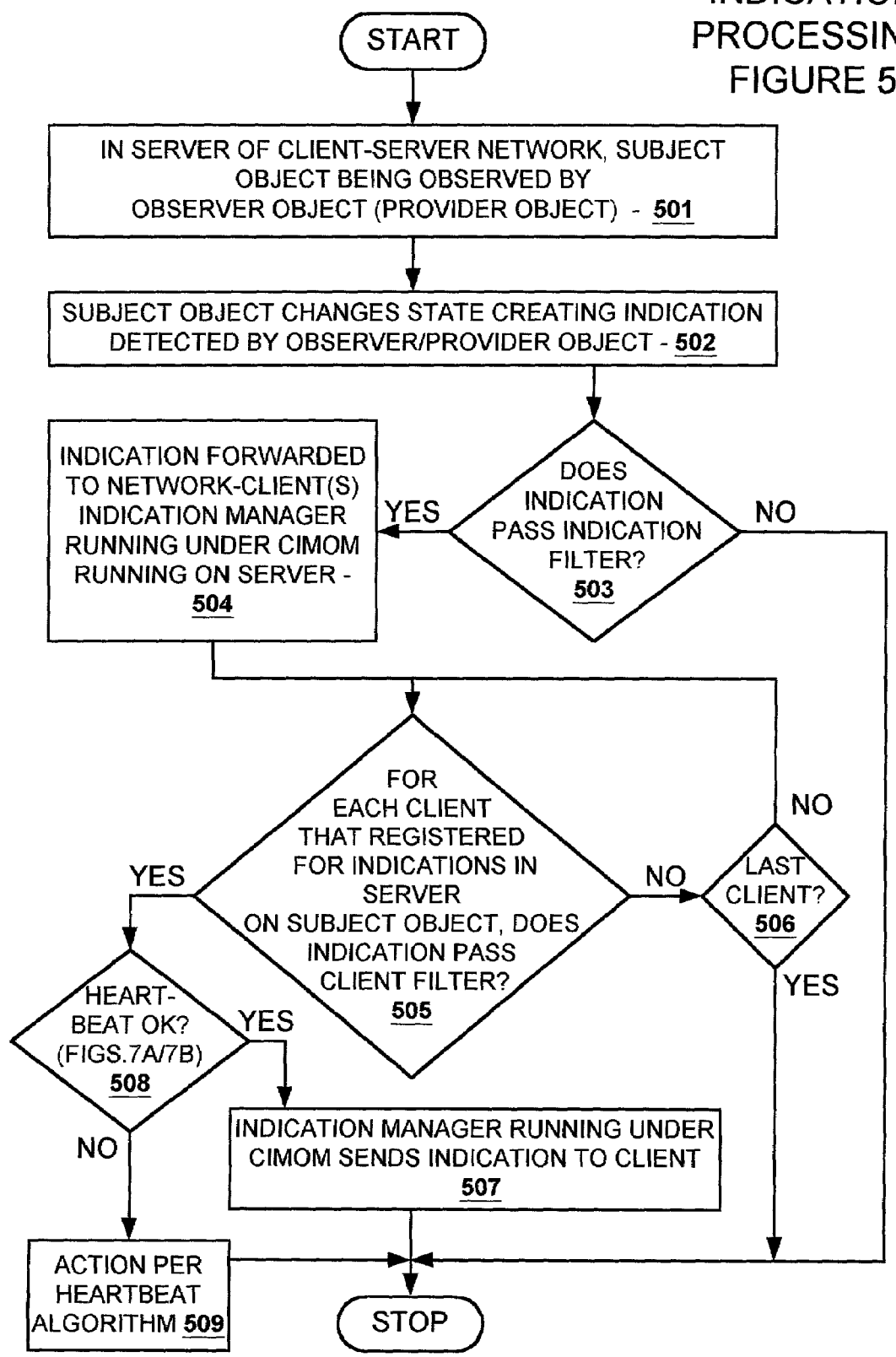

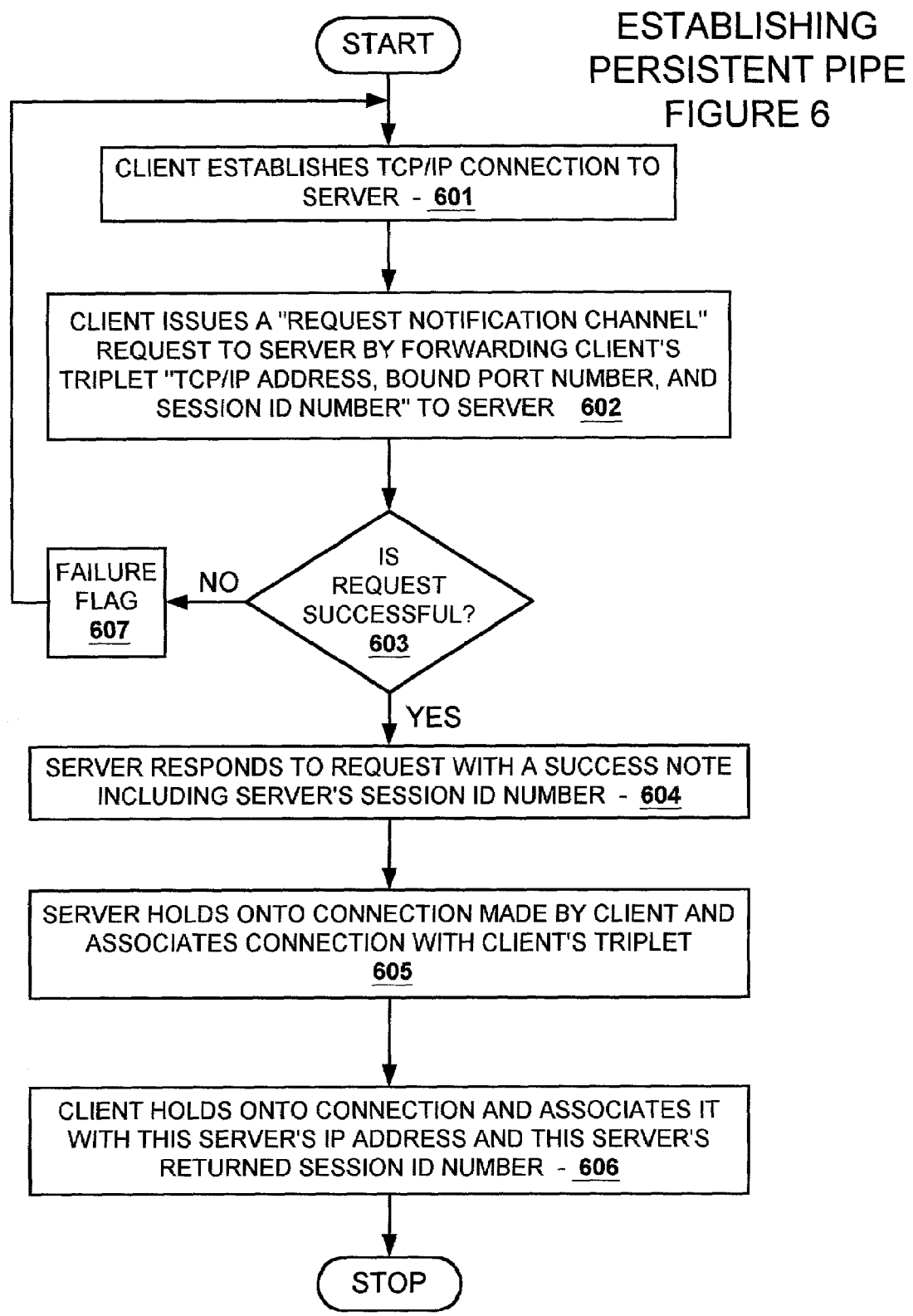

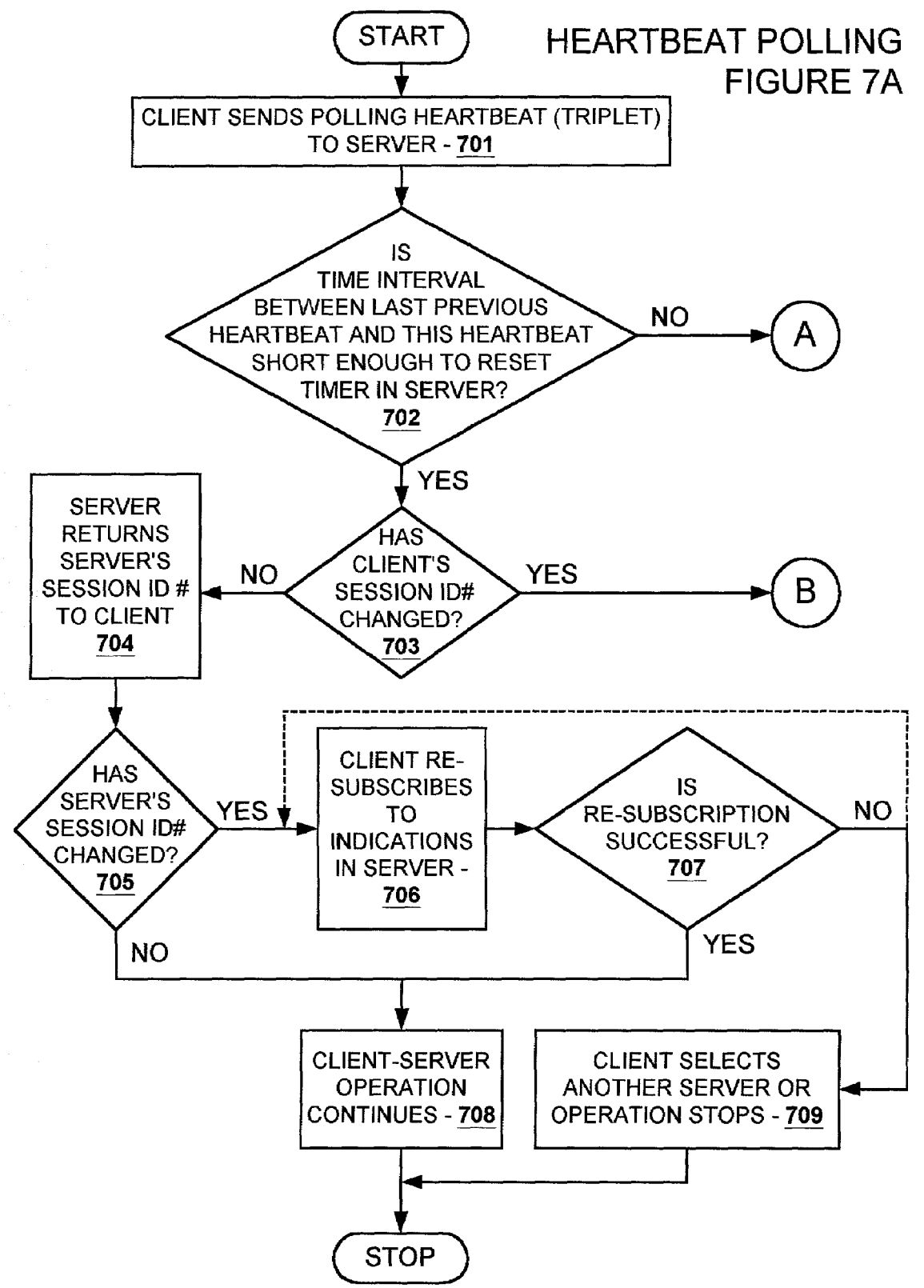

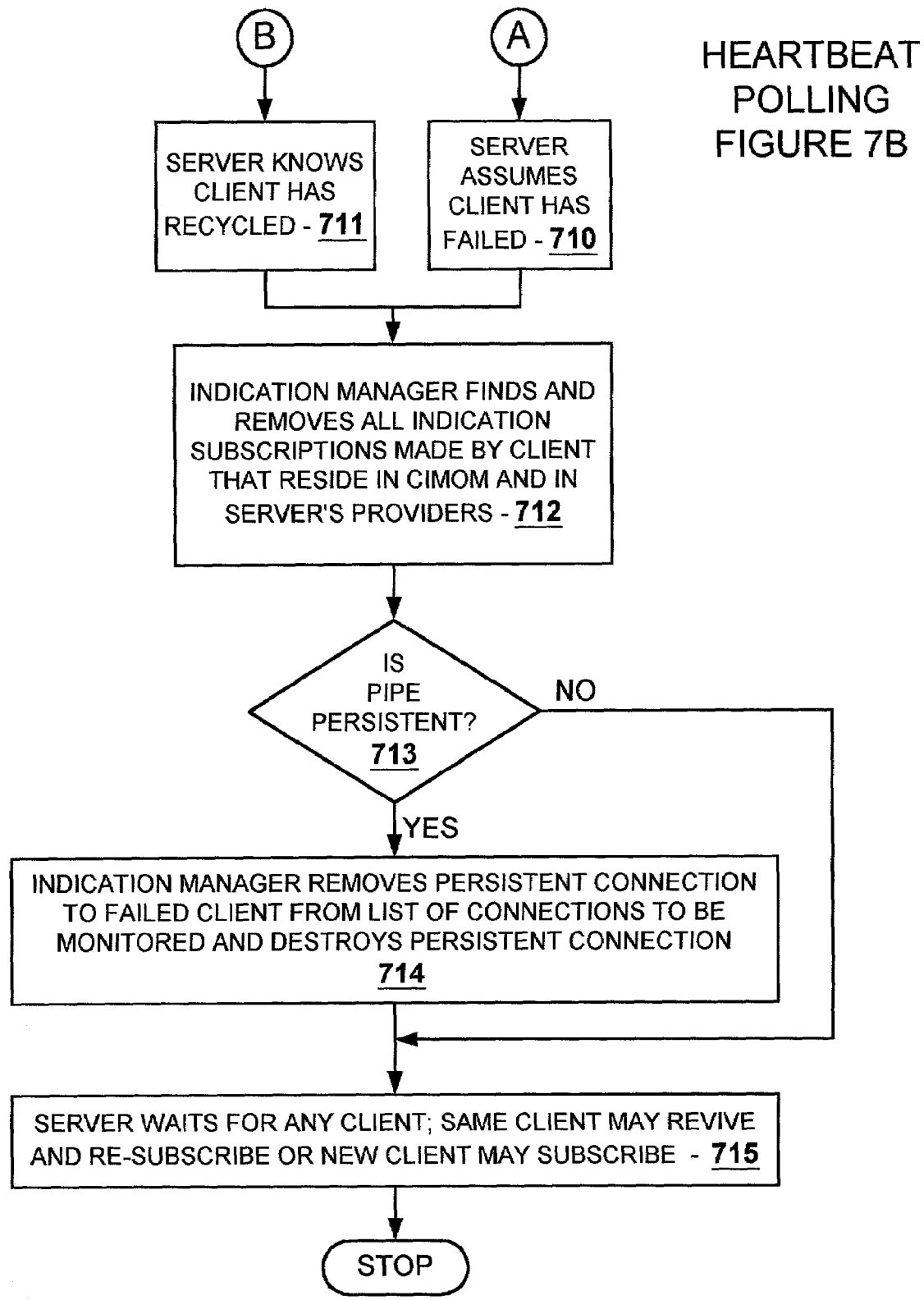

ROBUST INDICATION PROCESSING

A portion of the disclosure of this patent document contains command formats and/or other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to apparatus, methodology, systems, and/or computer program product for monitoring nodes in a client server environment and, more particularly, relates to the processing of indications sent from indication publishers or sources to indication subscribers in those clients and servers.

2. Description of Prior Art

Client-server network configurations are well known in the computer arts. A client requests information and such information is provided, or served-up, by its server(s). A human user of the network, or his/her graphical user interface (GUI), can be conceptualized as a "client" who is being served by the network or the network's components. Reference is made to FIG. 1 wherein network 100 shows user interface or client 101 in communication with servers 102, 103, and 104 over bus structure 105. Client 101 makes requests of any one or more of these servers which provide, or serve up, the requested information back to the client over the bus. And, within the network entities or components or nodes of such network (within client 101 or any of the servers), inanimate hardware/software sub-systems, other nodes, or processes that are being "served" in some capacity by other such sub-systems, nodes, or processes ("servers") are also referred to as "clients" of those servers.

Management of these client-server networks is a very important function that must be maintained to ensure that the networks operate as intended and serve network users as expected. This management function may be accomplished through distributed management software which can be distributed within a client-server network. If a client-server network is running such software that is also object-oriented, typically many objects reside in each of the clients and/or servers. Information from each of these objects may be necessary to satisfy certain information requests in pursuit of executing certain distributed management software functions. An object, in computer software terms, is a dedicated area of memory which can be thought of as an impervious container holding both data and instructions within itself, both defining itself and its relationships to other objects in the computer system or network. An object can send and receive messages to and from other objects, respond and react to such messages (e.g. commands) but shall normally be impervious to internal scrutiny. For example, in a storage processor (a kind of computer) each object may describe or relate to a specific tangible detail in the processor (e.g. a fan, power switch, cache memory, power supply, disk drive interface, etc.), where these tangible objects in the storage processor can send messages to each other and to other objects outside the processor.

As noted, it is important to have this management software run as efficiently as possible. In order to manage various components of a client-server network such as a storage network, there has to be frequent, if not continuous, monitoring of operation of at least the important objects comprising various critical aspects of, for example, a storage system in that storage network. One of the techniques used to monitor objects within an object-oriented network involves "observers" or "observer objects" which are used to observe or monitor "subject objects". When a subject object changes state, it "fires back" an instantaneous indication thereof to a component that is interested in the state change of that subject object. The subject object is the "indication source". The "indication" is the message sent by subject object to observer object, or from server to client, to indicate a change has occurred. The observer or its client can be viewed as an "indication subscriber" or a "subscriber to indications" where the observer observes the change of state and its client is interested in the change. The "indication subscription" is the "request" for the indication or state-change-message, and reflects the interest that the subscriber or client has in the event. "Observer infrastructure" is whatever is required to enable the indication to be sent from subject object to observer object. The subject object can be grouped with other objects within a package termed a "provider".

That change of state, once detected and communicated by way of this observer or indication technique, can then be managed by the distributed management software. This activity is termed "asynchronous" notification, which is very efficient as contrasted with slower and arguably more complex prior notification techniques which provided each notification only in response to an individual request. Asynchronous notification does not have to wait for an individual request to be made—it employs objects which are set at "hair-trigger" alertness to react simultaneously with observed state changes in their respective subject objects.

Industry standards committees have evolved to bring uniformity to different developmental directions where possible. One such committee is known as Distributed management Task Force (DMTF) and has generated a particular standard called Web Based Enterprise Management (WBEM) using the Common Information Model (CIM). Asynchronous notifications may now be implemented substantially in accordance with CIM and the WBEM standard. Asynchronous notification was used, and observers were discussed, in U.S. patent application Ser. No. 10/027,694 filed Dec. 20, 2001, entitled: "Data Replication Facility for Distributed Computing Environments", inventors: R. J. Nordin, A. L. Bauer, S. Krishnan, and G. W. Lazar, assigned to the assignee of the instant application, and hereby incorporated herein by reference in its entirety. For further background information on the subject of observers, a good text reference is: "Design Patterns", authored by Erich Gamma, et al, published by Addison-Wesley, Chapter 5, starting at page 293 thereof, such chapter hereby incorporated herein by reference in its entirety.

However, despite the improved efficiencies provided by asynchronous notification, shortcomings still abound in the providing of these indications. For example, there are shortcomings related to failures of client or server that might go undetected although observers are being used, thus negatively impacting the effectiveness of these asynchronous notifications. This is especially true if indications are used in client-server networks where an observer is situated in a first process in a first computer and its observed subject object is situated in a different second process in a second computer. For another example, connections between client and server which carry these asynchronous notifications can not be relied upon to stay connected in most or all instances and therefore detract from the effectiveness of these asynchronous notifications. This, in turn, detracts from the overall efficacy of the distributed management software to which such notifications belong. Accordingly, there is a need for an improved notification scheme which compensates for these and other deficiencies of the prior art. Applicants' invention provides a welcome solution to these problems, as described hereinbelow.

SUMMARY OF THE INVENTION

Embodiments of the present invention include apparatus, method, system, and/or computer program product as techniques for processing computer software object indications in a robust manner. In a first aspect of the present invention, there is a plurality of objects in at least one server, in a client-server network having at least one client and at least one server. Techniques are provided for monitoring the state of at least certain of the nodes. An indication subscription is established for each one of the certain nodes. An indication is provided when its respective node changes state. And, heartbeat polling periodically determines that the server is fully operational, thereby determining that the means by which the indication subscription is established and the means by which the indication is provided are also fully operational. Heartbeat polling also determines that the client is operational.

In another aspect of the present invention techniques are provided for monitoring the state of objects in a client server network having a plurality of objects. A connection is established between the client and the server. Indication subscriptions are established for monitoring certain of the objects. An indication is fired-back from each one of the certain objects in the server through the connection from the server to the client when each one of the certain objects in the server changes state. The server is periodically polled to determine overall operational status of the means by which the indication subscriptions are established and the means by which the indications are fired-back. Responsive to each operation of the means by which the server is periodically polled, an ID number is provided which changes to a different ID number only after the server has recycled. Responsive to the different ID number being provided, any indication subscriptions which were lost because the server has recycled are re-established. The periodic polling also permits determination of overall operational status of the client.

In a further feature of the present invention, the connection established between client and server can be a persistent connection, a connection that does not go away. And, if the client server network is part of, or operates over, the Internet or another public network with which firewall protection is typically used, then the persistent connection can be enabled to tunnel through, or be maintained in the presence of, such firewall protection.

In yet another aspect of the present invention, techniques for monitoring certain objects in a client server network comprise: observing each one of the certain objects; providing an indication when each object changes state; subjecting each indication to an indication filter to obtain a filtered indication; if a filtered indication is obtained, forwarding it to an indication manager; if the network includes multiple clients, determining which clients registered for the filtered indication to obtain registered clients; heartbeat polling to determine if both the registered clients and the server are functioning properly; and, if the server is functioning properly, having the indication manager forward the filtered indication to each registered client that is functioning properly.

It is thus advantageous to utilize embodiments of the present invention in client-server networks, such as, for example, storage networks employing object-oriented software on storage systems and their clients. In these kinds of networks, continuous monitoring of software objects, such as, for example, fan objects, disk objects, logical unit (LUN) objects, etc., is performed as an essential part of the overall storage network management function which is accomplished by management software distributed across the clients and servers. By utilizing embodiments of the present invention, such continuous monitoring is achieved in a manner that guards-against various potential failures, thereby providing a more reliable and efficient overall management of the network. Embodiments of the present invention are applicable to any client server network employing object oriented software, and are not in any manner limited to client server storage networks.

BRIEF DESCRIPTION OF THE DRAWINGS

FIG. 4 is an architectural diagram of a storage system server node in the client server network of FIG. 2 depicting various provider functions;

FIG. 5 is a flowchart depicting an algorithm for indication processing in accordance with principles of the present invention;

FIG. 6 is a flowchart depicting an algorithm for the establishment of a persistent pipe in accordance with principles of the present invention; and, FIGS. 7A and 7B are interconnected flowcharts depicting an algorithm for heartbeat polling in accordance with principles of the present invention.

DESCRIPTION OF THE PREFERRED EMBODIMENTS

Overview

Figure 1:
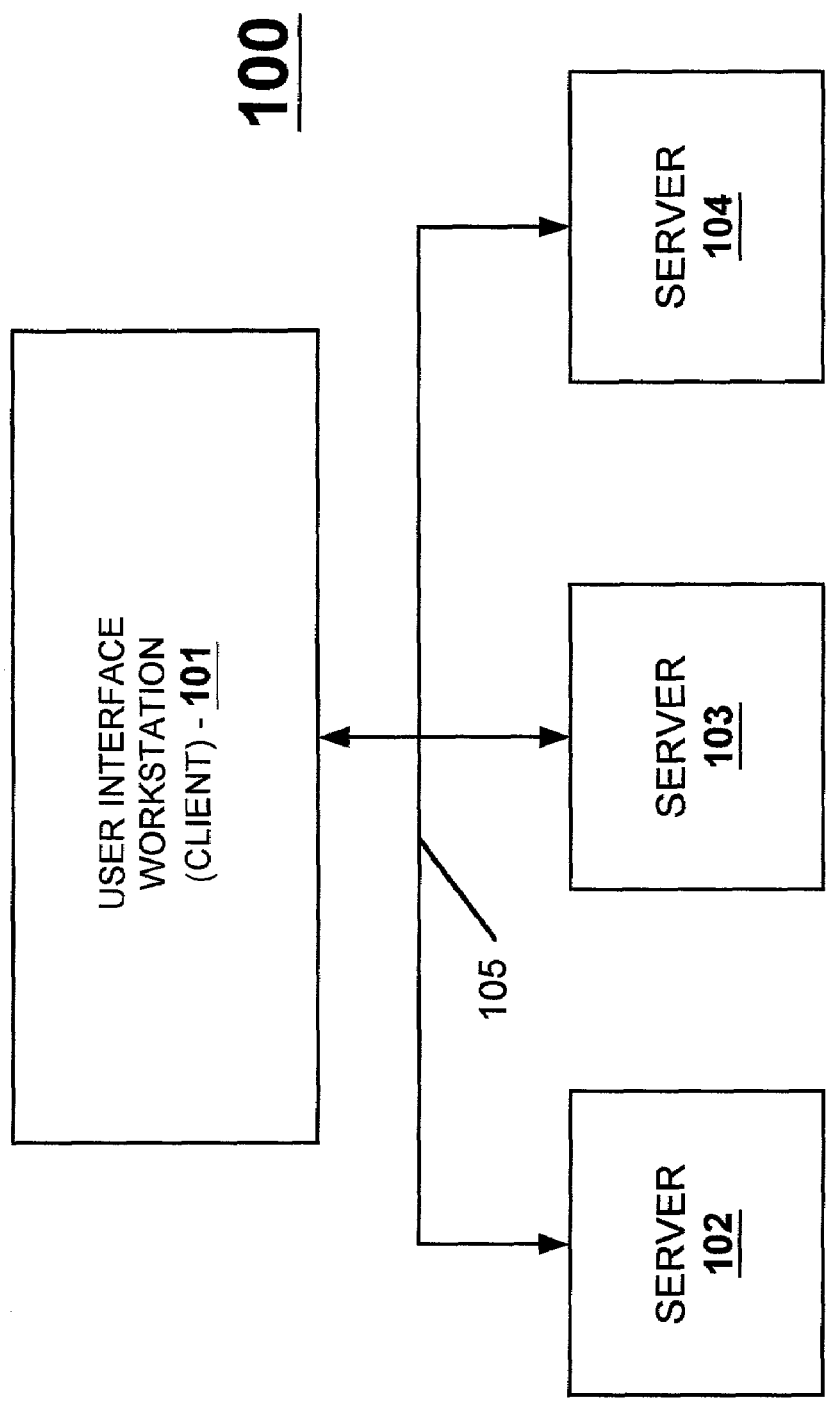
FIG. 1 is a block diagram showing a prior-art client-server network.
Figure 2:
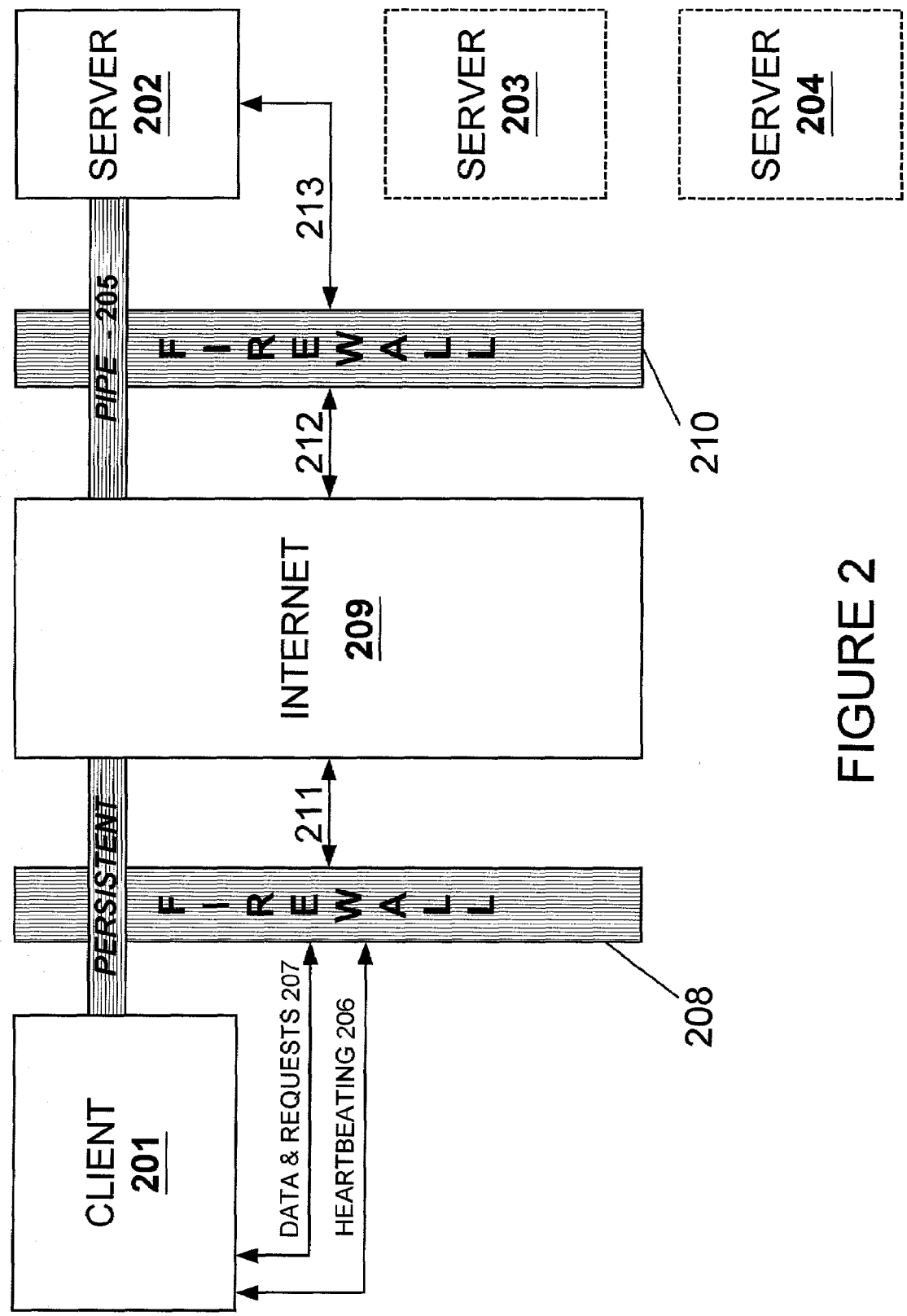
FIG. 2 is a block diagram of a client server network in accordance with principles of the present invention.

Preferred embodiments of the present invention are implementations of principles of the present invention. Like reference numerals in different Figures represent like or similar items. The present invention relates to an improved technique for observing certain objects in a client server network to determine if and when those objects change state and for notifying one or more interested clients or servers (when acting as clients) upon those state changes. In addition to providing such notifications, or firing back such indications, the technique of the present invention also employs a polling scheme to ensure that accurate information about operational status of a server is available to its client and vice versa. This accurate operational status information will prevent the client or server from drawing erroneous conclusions based solely on such notifications or indications which may be erroneous if there has been momentary, or longer term, server or client failure. Without this additional polling scheme such erroneous indications may otherwise appear as accurate to client or server. Clients and servers may typically be computers which are config- FIG. 2—Block Diagram FIG. 2 is a block diagram of a client server network in accordance with principles of the present invention. Client 201 and servers 202, 203, and 204 may be similar to their respective counterparts shown in FIG. 1. Although servers 203 and 204 are shown uncoupled to the network for purposes of enhancing clarity of presentation, they are to be understood as being operatively coupled in a manner that does not detract from operation of client 201 and server 202. FIG. 2 also shows Internet 209. Since network components connected to the Internet potentially are exposed to unwanted communications via the Internet, client 201 has established network protection via firewall 208 and server 202 has established network protection via firewall 210. Client 201 is communicatively coupled to server 202 by way of persistent pipe 205 which is shown to "tunnel" through firewall 208, operatively couple into and out of Internet 209, tunnel through firewall 210 and operatively connect to server 202. Persistent pipe is a special connection intended for a special communication about which more detail shall be provided hereinbelow. Other communication links include data and requests link 207 and heartbeating link 206 which are operatively coupled from client 201 to server 202 through the Internet and both firewalls via links 211, 212, and 213 as shown. These links may be Transmission Control Protocol/Internet Protocol (TCP/IP) connections and data can flow in both directions as in a "full-duplex" arrangement. However, in this configuration, although the client can make a request of the server, the server cannot make a request of the client—requests flow from client to server and responses flow from server to client. It should be understood that there may be other connections between client 201 and servers 202, 203, and 204, and between each server and the others which are not germane to the explanation of operation of the present invention and therefore not shown.

Persistent pipe 205 is a special TCP/IP connection between client and server. Client 201 initiates the establishment of the connection by submitting a request to its operating system to bind to a particular port at the client side having a particular port number. This is a request to allow client 201 to have exclusive control over this particular port. After the operating system grants this request, client 201 creates a "triplet" address identifier consisting of its TCP/IP address, bound port number and a session ID number. The session ID number is essentially a time stamp which changes once for each time the client recycles from on to off and back to on. In the event that multiple GUI's are running on the same client workstation, although each one could have the same session ID number, the "triplet" for each one would be different. This distinguishes between multiple clients which are "talking" to the same server. Client 201 contacts server 202 via data and requests link 207, link 211, Internet 209, and links 212 and 213 requesting this special connection. After that contact, server 202 accepts the client connection at the server side and keeps it open, which makes the connection persistent. In like manner server 202 can generate its own similar triplet address identifier consisting of server's TCP/IP address, server's bound port number and a server session ID number (a different timestamp). The server session ID number likewise changes once for each time the server recycles from on to off and back to on.

After client 201 contacts server 202 regarding the establishment of this special TCP/IP connection, with the operating system(s) granting bound ports at both the client and server ends, server 202 holds onto (retains in memory) its bound port number and the client's bound port number, and thus holds onto the special connection; the server also associates the special connection with the client's IP address from the client's triplet. Likewise, client 201 holds onto (retains in memory) its bound port number and the server's bound port number, and thus also holds onto the special connection; the client also associates the special connection with the server's IP address and returned session ID number from the server's triplet. This special connection is termed "persistent" because it is not readily torn-down as a result of normal network operation or communication. Moreover, because of the bound port numbers and TCP/IP addresses mutually exchanged between client 201 and server 202, this connection shall be open to all communication between them, regardless of any firewalls that would otherwise have been effective to block certain communication. This state of open communication with respect to firewalls is sometimes referred to as "tunneling through firewalls". Persistent pipe 205 may be reserved exclusively for transmission of indications that are fired back from selected objects in server 202 for which subscriptions have been registered by client 201. These subscriptions are requests that are made over data and requests line 207 and links 211, 212, and 213. More explanation about this subscription operation shall be provided hereinbelow. (In a network with multiple servers, if a first server should subscribe to certain indications from another server for a particular reason, then the first server is acting as a client with respect to the other server during the time interval in which these certain indications have been subscribed.)

Link 206 carries a request from client 201, via link 211, Internet 209, and links 212, and 213 to server 202. This request is generated periodically at a relatively low repetition rate and is therefore sometime referred to as "light polling" or "heartbeating", which requires only a small amount of data flowing between client and server as compared with normal polling, to accomplish the intended objective. This request is the client's triplet address identifier discussed above. Server 202 responds to client 201 with its session ID number via links 213, 212, Internet 209, and links 211, and 206. This light polling or heartbeating request allows client 201 to determine whether or not server 202 is operating or functioning properly because either "no response" or "incorrect server session ID response" will provide such operational information. Moreover, if server 202 is operating or functioning properly then all of its components including its indication infrastructure must also be operating properly, which is what the heartbeating activity is intended to determine. This heartbeating activity also reflects operational status of client 201. This client aspect of heartbeating as well as other additional heartbeating explanation shall be provided in connection with a discussion of FIG. 3.

Figure 3:
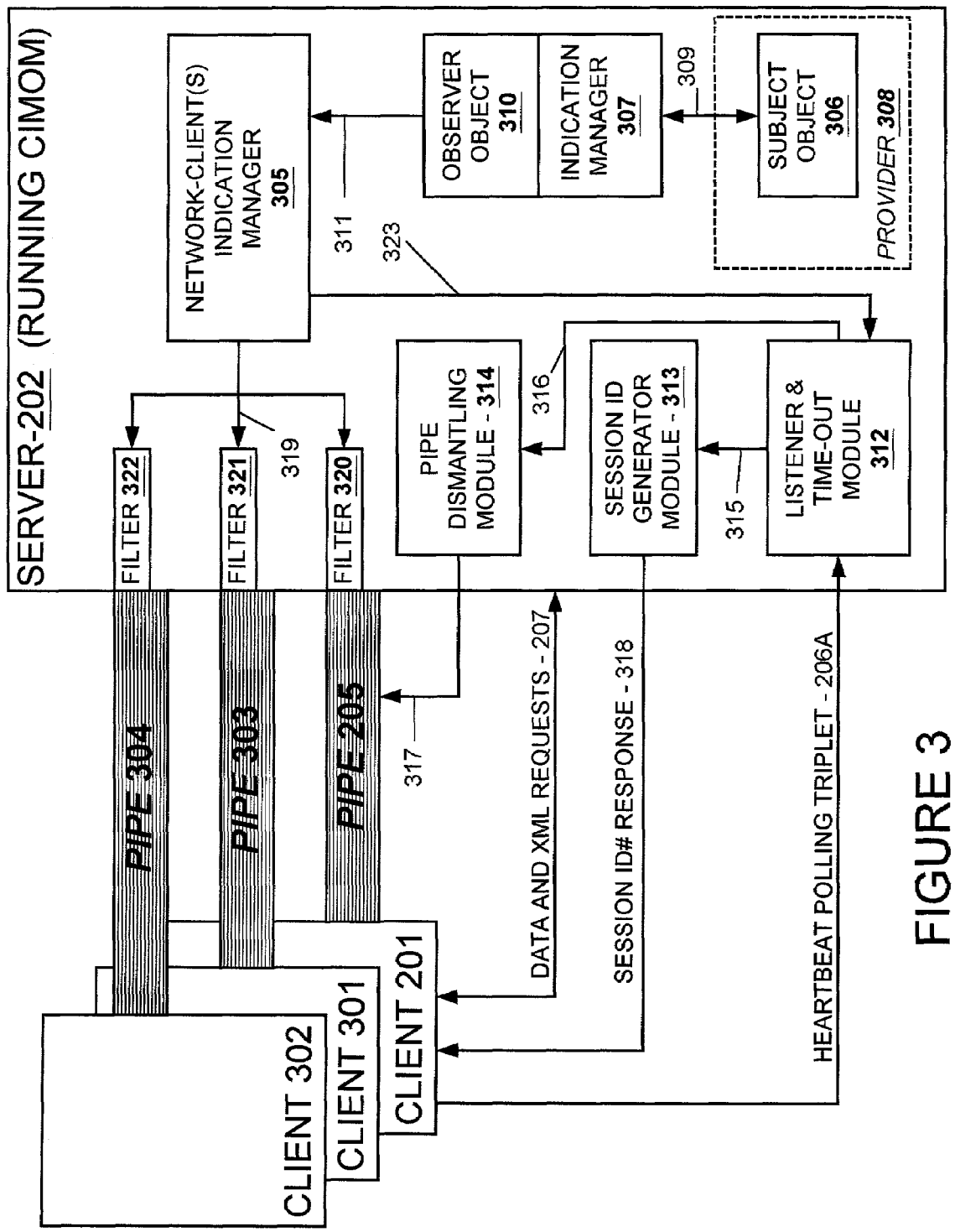
FIG. 3 is another block diagram of a client server network in accordance with principles of the present invention.

FIG. 3—Block Diagram

FIG. 3 is another block diagram of a client server network without the Internet environment and protective firewalls, but also in accordance with principles of the present invention. In the upper left of the diagram, three clients are shown: clients 201, 301, and 302. They are communicatively connected by pipes 205, 303, and 304 respectively to server 202 at the right side of the diagram. If connections at the server side and the client side of these pipes are made in accordance with the "persistent pipe connection protocol" described in connection with FIG. 2, then these pipes are also made persistent. Otherwise, if the ports are not bound, or the protocol is not otherwise followed, then these pipes may represent ordinary TCP/IP connections. Indications can be fired-back over non-persistent pipes, but such an asynchronous notification scheme runs the risk of failed communication; if the connection and/or the server has failed, the client may not know about either or both failures. Since there are no firewalls shown in FIG. 3, tunneling through firewalls is not an issue in this Figure.

Client 201 is also shown as being communicatively connected to server 202 via data and XML requests bidirectional link 207. Client 201 is further communicatively connected to server 202 via heartbeat polling triplet link 206A and session ID # response link 318. Clients 301 and 302 are also communicatively connected in a similar manner, but such connections are not shown to enhance clarity of presentation. (In FIG. 2, bidirectional heartbeating link 206, links 211, 212, and 213, and their operative coupling through the Internet are the functional equivalent of heartbeat polling triplet link 206A and session ID# response link 318.)

Indication Processing:

With respect to indication processing functionality, in the lower right-hand corner of server 202, subject object 306 is depicted as a generic software object and may be, for example, a LUN object. Subject object 306 is shown "packaged" within provider 308. Other providers (not shown) may package other kinds of objects such as user account objects. Subject object 306 is communicatively coupled via bi-directional link 309 to indication manager block 307. An indication manager is a software module that processes indications and is functionally positioned between any client and server that wants to exchange indications. (See FIG. 4 for further examples of how indication managers are functionally positioned between clients and servers that exchange indications.) Block 307 is depicted as abutting observer object 310 and is thus intended to depict an operative coupling to its observer object 310. Observer object 310 is also operatively coupled over link 311 to network client(s) indication manager 305 which is operatively coupled via link 319 to filters 320, 321, and 322. These filters are operatively coupled respectively to pipes 205, 303, and 304. (Software functionality shown in server 202 is manifested within one process whereby each operative coupling is actually a method call within this same process. One object is invoking a method on another object which accomplishes the operative coupling. The links and the abutting functionality shown are thus method call representations.) Client 201, server 202, pipe 205, and links 206 and 207 are also shown in FIG. 2.

In operation, after client 201 and server 202 establish their pipe connection as described earlier in connection with FIG. 2, client 201 subscribes to certain indications in server 202. In other words, client 201 requests that certain objects of interest to that client provide indications about when each of those certain objects has a state change. This subscription, or registration for indication, operation is processed in extensible markup language (XML) and will be discussed in more detail later in connection with XML table III. A state change can be a failure, a degradation, an addition or deletion of a quantity to or from an object, etc. For example, if client 201 had subscribed to an indication for subject object 306, then in the graphical user interface or GUI (not shown) associated with client 201 an icon is displayed on the terminal screen corresponding to subject object 306. If subject object 306 is, for example, a LUN, and if there is no fault with that LUN, the icon would typically be gray color. But, if there is a fault with that LUN the icon is supposed to have changed on the terminal screen to another color, typically red. This change in color would signal to the user that there is a fault in that LUN. In order to achieve this communication with the client's GUI, the following operation is undertaken.

Indication manager 307 is focused on, or attuned-to the filter settings of, LUN object 306, although indication manager 307 could also simultaneously be focused on other objects (not shown). At the moment that LUN object 306 changes state, for example, changes from faultless to faulted state, indication manager 307 processes that state change indication. Indication manager 307 has a lookup table (not shown) to which it refers and will find all clients in its table that are interested in this state change. Indication manager 307, in this instance, may find only companion observer object 310 in its table and which happens to be interested in that state change. Observer object 310 via indication manager 307 notes that this LUN's property "IS FAULTED" has changed from "false" to "true" indicating a fault. Observer object 310 and indication manager 307, running under the CIMOM which is running on server 202, thereby inherently advise the CIMOM that IS FAULTED has changed for LUN object 306. Network-client(s) indication manager 305, as well as all other functionality shown in server 202, are also running under the CIMOM. Therefore, indication manager 305, acting as client to the provider-server (not shown) containing observer object 310, receives the IS FAULTED indication of the state of LUN 306 via link 311 (as a method call). As noted, indication manager 305, observer object 310 within its unshown provider, indication manager 307, and provider 308 including LUN 306 all run in the same process space as the CIMOM and therefore do not have to do any special networking therebetween, as compared with, for example, the networking required between client 201 and server 202.

Network-client(s) indication manager 305 is part of an indication infrastructure that essentially serves network clients such as 201, 301 and 302. As noted above, indication manager 305 is aware of the state change which occurred in subject object LUN 306 and, therefore, applies the IS FAULTED property to each of three indication filters 320, 321, and 322. Each of these filters reflects interest by its respective client in only particular indications. On the one hand, for example, if filters 321 and 322 reflect no interest by clients 301 and 302 respectively in state changes in LUN 306, then filters 321 and 322 prevent the firing back of such state change indications over pipes 303 and 304 respectively. On the other hand, if filter 320 does reflect interest by its client 201 in state changes in LUN 306, then it allows the firing back of such state change indication over pipe 205 to client 201. Accordingly, after processing this indication in the code in client 201, the LUN 306 icon on the user interface (not shown) associated with client 201 will turn from gray to red indicating a fault.

The property "IS FAULTED" is a property of the LUN object and may be implemented in virtually any high level programming language. Code for server 202 in FIG. 3 or for storage system 400 in FIG. 4 is written in C++. Other object oriented programming languages could have been used, such as JAVA®. Similarly, JAVA is used to write the code for client 201, where other languages such as C++ could have been used in the client. JAVA was selected for the client because it is portable where it can be used across different platforms. The client may operate on one of several platforms such as, for example, a UNIX® or WINDOWS NT® platform. JAVA provides an advantage since the code need not be rewritten when moving from one platform to another. Also, JAVA is a language in which code can be written relatively quickly. C++ was selected for the server because it requires relatively fewer resources than other high level languages such as JAVA and therefore it permits conservation of resources in the server.

Heartbeating:

Client 201 generates a periodic polling triplet identifier at intervals which are settable by the user or client. These intervals are set to be relatively long, so the polling traffic is kept to a minimum, the polling thereby being termed "light polling" or "heartbeating". This triplet identifier is the same identifier established by the client when the special TCP/IP connection was being established. As noted, this triplet identifier comprises (1) Client's TCP/IP address; (2) bound port number; (3) time stamp session identifier. The TCP/IP address is the local IP address of the workstation or the client on which the application is running. The bound port is obtained by requesting permission from the operating system to have exclusive control over a particular port; thus if there are two instances of the client application that are running on the same machine, only one instance can be associated with this bound port and the other instance must operate through a different port number. The time stamp identifier can be a Greenwich mean time 32 bit number of seconds, or some other scheme that always permits a sufficiently unique session identification number (ID#) to ensure that two session ID#'s will not be the same at any instant.

Listener and time-out module 312 receives heartbeat polling triplet 206A from client 201. There is a re-settable timing scheme (not shown) in module 312. If the triplet does not arrive on a timely basis, sufficiently early, then the scheme times-out. Thereafter, server 202, through operation of its CIMOM, assumes or concludes that client 201 has malfunctioned or failed, because under normal conditions of operation of client 201, such heartbeat would be steady and on time. Destruction of retained client information is initiated to preserve server resources. Accordingly, a client data destruction signal is forwarded over connection 323 from indication manager 305 to module 312 to initiate pipe dismantling, whereupon module 312 notifies pipe dismantling module 314 over link 316. Thereafter, module 314 does what is required to dismantle pipe 205 via link 317. As noted, this dismantling operation is undertaken by server 202 to preserve its resources. If server 202 concludes that client 201 has failed, then there is no point in server 202 putting any resources into maintaining communication pipe 205 to a failed client. In addition, any other resources in server 202 that may have been dedicated to serving client 201, such as all notification subscriptions from client 201 which are in the subscription data base of server 202, are also destroyed.

However, if the heartbeat polling triplet does arrive on a timely basis, the timing scheme in module 312 is reset. This means that client 201 is operational and this operational client status is communicated to server 202 and over link 315 to session ID# generator module 313. Module 313, in response to arrival of that heartbeat communication, supplies a server session ID# to client 201 over link 318. If the server was continuously operating, without any brief power interruption or other type of failure, the session ID# shall be the same number which was returned to client 201 when pipe 205 was established (see discussion in connection with FIG. 2). But, if the server failed and returned, even between heartbeats, its session ID# shall necessarily change. Thus, a changed session ID number signifies a server failure. Client 201 had stored the session ID# for server 202 when pipe 205 was established, and client 201 can thus detect if the server failed by comparing server ID#'s. If there was a failure, client 201 can destroy all resources earlier dedicated to server 202, can re-establish the permanent connection, and can then re-subscribe to all of the indications to which it had earlier subscribed if still interested in them. This heartbeating activity thus saves wasted resources by the client and also avoids erroneous client server operation in processing otherwise undetected erroneous indications.

Furthermore, since the triplet contains the session ID# of client 201, which changes every time the client has a momentary power failure or other interruption, this also allows server 202 to detect client failures over and above client failures suggested by time-out action of module 312. Server 202 had earlier stored the session ID# for client 201 which was forwarded with the initial triplet from client 201 when server 202 was first contacted to establish a persistent connection (see discussion in connection with FIG. 2). Even if the connection was not persistent, client 201 would have sent its IP address bound port number, and its session ID# to establish a connection. In either case, server 202 can now compare the client session ID# included in the most recently received heartbeat triplet from client 201 with the earlier stored client session ID#. If they match then the client has not failed, but if they do not match then the client has experienced an otherwise undetected failure. If there is a mismatch, then server 202 destroys all resources that it had dedicated to client 201, including dismantling pipe 205 via link 317. Server 202 is then ready for, or receptive to, communication from any client that may wish to be served by server 202 including client 201 which may revive and re-subscribe to indications. Therefore, server 202 is ready for a subscription to indications by a new client, or is prepared to receive further subscription to further indications by other previously connected clients, such as clients 301 or 302 which are shown connected to server 202 via pipes 303 and 304 respectively.

Data and XML requests line 207 carries registration requests and responses in XML. This is protocol for use by client and server and is human-readable which makes it easy to use, generate and interpret on almost any platform. Examples of such protocol written in XML language are presented in tables I through VI. The XML statements in these tables are for illustrative purposes only, to illustrate particular aspects of the protocol, and do not necessarily inter-relate between and among themselves in a cohesive or cooperative manner. Table I reflects XML statements that may be used by the client in contacting the server to establish a pipe for use in firing-back indications. It reflects the "RegisterNotificationChannel" method call and provides the client's triplet as three attributes of "IPARAMVALUE NAME".

TABLE I

CLIENT ESTABLISHING THE PIPE - XML STATEMENTS

```
<?xml version="1.0" ?>
<CIM CIMVERSION="2.0" DTDVERSION="2.0">
<MESSAGE ID="877" PROTOCOLVERSION="1.0">
<SIMPLEREQ>
<IMETHODCALL NAME="RegisterNotificationChannel">
<LOCALNAMESPACEPATH>
<NAMESPACE NAME="root" />
<NAMESPACE NAME="emc" />
<NAMESPACE NAME="navisphere" />
```

TABLE I-continued

CLIENT ESTABLISHING THE PIPE - XML STATEMENTS

```
</LOCALNAMESPACEPATH>
<IPARAMVALUE NAME="ClientHost" TYPE="string">
<VALUE>128.221.42.85</VALUE>
</IPARAMVALUE>
<IPARAMVALUE NAME="ClientPortNumber" TYPE="string">
<VALUE>8080</VALUE>
</IPARAMVALUE>
<IPARAMVALUE NAME="ClientSessionId" TYPE="uint32">
<VALUE>72435388</VALUE>
</IPARAMVALUE>
</IMETHODCALL>
</SIMPLEREQ>
</MESSAGE>
</CIM>
```

Table II reflects XML statements that may be used by the server in responding to statements in Table I from the client in establishing the pipe.

TABLE II

SERVER ESTABLISHING THE PIPE - XML STATEMENTS

```
<CIM CIMVERSION="2.0" DTDVERSION="2.0">
<MESSAGE ID="877" PROTOCOLVERSION="1.0">
<SIMPLERSP>
<IMETHODRESPONSE NAME="RegisterNotificationChannel">
<RETURNVALUE TYPE="uint32">
<VALUE>1022251551</VALUE>
</RETURNVALUE>
</IMETHODRESPONSE>
</SIMPLERSP>
</MESSAGE>
</CIM>
```

Table III reflects XML statements that may be used by the client in registering for an indication after the pipe has been established in accordance with statements reflected in Tables I and II. In this example, the indication for which registration is sought is a change indication, and the client is registering for a change observer in connection with a user that had been added to the security database of the network which may involve providers such as security provider 409 in FIG. 4.

TABLE III

CLIENT REGISTERING FOR AN INDICATION

```
<?xml version="1.0" ?>
<CIM CIMVERSION="2.0" DTDVERSION="2.0">
<MESSAGE ID="877" PROTOCOLVERSION="1.0">
<SIMPLEREQ>
<IMETHODCALL NAME="registerobserver">
<LOCALNAMESPACEPATH>
<NAMESPACE NAME="root" />
<NAMESPACE NAME="emc" />
```

TABLE III-continued

CLIENT REGISTERING FOR AN INDICATION

```
<NAMESPACE NAME="navisphere" />
</LOCALNAMESPACEPATH>
<IPARAMVALUE NAME="CLASSNAME">
<CLASSNAME NAME="NaviSec_SecurityAccount" />
</IPARAMVALUE>
<IPARAMVALUE NAME="ipaddress">
<VALUE>128.221.42.85</VALUE>
</IPARAMVALUE>
<IPARAMVALUE NAME="portnumber">
<VALUE>8080</VALUE>
</IPARAMVALUE>
<IPARAMVALUE NAME="ClientSessionId" TYPE="uint32">
<VALUE>24751527</VALUE>
</IPARAMVALUE>
<IPARAMVALUE NAME="INDICATIONTYPE">
<VALUE>Change</VALUE>
</IPARAMVALUE>
<IPARAMVALUE NAME="INDICATIONFILTER">
<VALUE.ARRAY>
<VALUE>userName</VALUE>
<VALUE>role</VALUE>
<VALUE>scope</VALUE>
</VALUE.ARRAY>
</IPARAMVALUE>
<IPARAMVALUE NAME="OBJECTNAME">
<INSTANCENAME CLASSNAME="NaviSec_SecurityAccount">
<KEYBINDING NAME="key">
<KEYVALUE>admin:0</KEYVALUE>
</KEYBINDING>
</INSTANCENAME>
</IPARAMVALUE>
</IMETHODCALL>
</SIMPLEREQ>
```

Table IV reflects XML statements that may be used by the server in responding to statements in table III from the client in registering for an indication.

TABLE IV

SERVER RESPONSE TO CLIENT'S REGISTERING FOR AN INDICATION

```
<CIM CIMVERSION="2.0" DTDVERSION="2.0">
<MESSAGE ID="877" PROTOCOLVERSION="1.0">
<SIMPLERSP>
<IMETHODRESPONSE NAME="registerobserver">
<IRETURNVALUE TYPE="boolean">
<VALUE>true</VALUE>
</IRETURNVALUE>
</IMETHODRESPONSE>
</SIMPLERSP>
</MESSAGE>
</CIM>
```

Table V reflects XML statements that may be used by the client in sending the triplet heartbeat to the server.

TABLE V

CLIENT'S HEARTBEAT REQUEST OF SERVER

```
<?xml version="1.0" ?>
<CIM CIMVERSION="2.0" DTDVERSION="2.0" >
<MESSAGE ID="877" PROTOCOLVERSION="1.0" >
<SIMPLEREQ>
<IMETHODCALL NAME="heartbeat" >
<LOCALNAMESPACEPATH>
<NAMESPACE NAME="root" />
```

TABLE V-continued

CLIENT'S HEARTBEAT REQUEST OF SERVER

```
<NAMESPACE NAME="emc" />
<NAMESPACE NAME="navisphere" />
</LOCALNAMESPACEPATH>
<IPARAMVALUE
NAME="ipaddress"><VALUE>128.221.42.85</VALUE></IPARAMVALUE><IPARAMVALUE
NAME="portnumber"><VALUE>8080</VALUE></IPARAMVALUE><IPARAMVALUE NAME=
"STARTUP"><VALUE>FALSE</VALUE></IPARAMVALUE><IPARAMVALUE NAME=
"FIREWALL"><VALUE>TRUE</VALUE></IPARAMVALUE><IPARAMVALUE
NAME="ClientSessionId"
TYPE="uint32"><VALUE>1167854639</VALUE></IPARAMVALUE></IMETHODCALL>
</SIMPLEREQ>
</MESSAGE>
</CIM>
```

Table VI reflects XML statements that may be used by the server in responding to the XML statements in table V.

TABLE VI

SERVER'S UNIQUE ID# RESPONSE TO HEARTBEAT REQUEST

```
<CIM CIMVERSION="2.0" DTDVERSION="2.0">
<MESSAGE ID="877" PROTOCOLVERSION="1.0">
<SIMPLERSP>
<IMETHODRESPONSE NAME="heartbeat">
<RETURNVALUE TYPE="sint32">
<VALUE>21996</VALUE>
</RETURNVALUE>
</IMETHODRESPONSE>
</SIMPLERSP>
</MESSAGE>
</CIM>
```

Clients 201, 301 and 302 each may have some similar software functionality to that shown in server 202, at least to the extent of including a similar client session ID generator module (not shown) and a similar client pipe dismantling module (not shown). The client utilizes the client session ID generator for purposes of generating a new client session ID number as part of its triplet, for benefit of the server, if and when the client recycles. And, the client utilizes the client pipe dismantling module for dismantling the persistent pipe to conserve client resources, if and when the server recycles, in which case the server's then-current session ID# would not match its last most previous session ID#. There may be other similar software functionalities as well.

FIG. 4—Storage System Server

FIG. 4 is a block diagram of a client server network similar to those of FIG. 2 or 3. More specifically, FIG. 4 shows storage system 400, similar to server 202, and therefore may represent a specific example of a server in the client server networks of FIG. 2 or 3. Client 201 is operatively coupled to storage system server 400 over link 412 (representing all communication links of FIG. 2 or 3). Client 201 is also operatively coupled to server 203 over link 414. And server 203 is operatively coupled to storage system server 400 over link 413. These links may all be TCP/IP connections. Storage system 400 depicts certain provider services useful in carrying out the objectives of the storage system. In storage system 400, indication managers 404, 405, 406, and 407 are functionally positioned between event monitor provider 408, security provider 409, legacy provider 410, and NAS (network attached storage) provider 411 respectively (each provider functioning as a client) and persistent provider 403 (functioning as server—see server directional arrow pointing towards those providers). Likewise indication manager 402 is functionally positioned between directory provider 401 (functioning as server) and persistence provider 403 (now functioning as client—see client directional arrow pointing towards the directory provider). As can be seen, and as noted earlier in connection with FIG. 3, an indication manager is always functionally positioned between any client and any server with respect to communicating an indication from server to client. Any indications sent solely between any provider on server 400 and any other provider on server 400 operate under a common process, such as CIMOM running on server 400 and therefore such indications are method calls.

Persistence provider 403, functioning as a client, is served-up indications from directory provider 401 via indication manager 402. Interaction between these two providers is further discussed in the incorporated by reference patent application. In turn, each of the providers: event monitor provider 408, security provider 409, legacy provider 410, and NAS provider 411 are served-up indications from persistence provider 403 via indication managers 404, 405, 406, and 407 respectively. Each indication manager has a lookup table (not shown). Therefore, each indication manager in this latter group, for example, shall find all clients in its table that are interested in state changes for persistence provider 403. The separate indication manager functionality depicted as indication managers 402, 404, 405, 406 and 407 could have been alternatively depicted as being incorporated into a single indication manager within the common process space of server 400. In that representation, the single indication manager would provide the same functionality provided by each of the individual indication managers taken together. If all of this indication processing is taking place in storage system server 400 where all providers are running in the same process space under CIMOM, server 400 does not have to do any special networking such as heartbeating to ensure accuracy. However, if client 201, or some other client associated with this network (not shown), has subscribed to indications from server 400 and/or server 203 which involve any of its providers, then the same heartbeating activity earlier described shall be needed between client 201 and server 400 to ensure robust and accurate indication processing.

For example, if client 201, or any other client associated with this network, drops a new file on server 203 or server 400 as the originator node, it performs in accordance with the explanation in the incorporated by reference patent application whereby it interacts with the master node for this network as backup node, etc. Then directory providers of network nodes (not shown) that are not originator node or master node get notified of the new file by the directory provider in the originator node or master node by way of observers as detailed herein and in the incorporated by reference patent application. Then, the persistence provider associated with each one of the directory providers in the various nodes in the network obtains the new file from the persistence provider of the originator or master node as backup, as the case may be, for their respective nodes. However, if client 201, or any other clients (not shown) have subscribed to indications for new file objects from the network shown in FIG. 4, then indications are fired back to those other clients with regard to the new file dropped on server nodes 203 or 400. In this scenario, where indications are sent outside of a common process, between clients and servers in a network running different processes, the heartbeating and persistent pipe aspects of the present invention facilitate robust and accurate indication processing as discussed hereinabove. It is to be understood that many more storage system providers could have been shown in storage system server 400 of FIG. 4, and only a few are shown as examples.

FIG. 5—Indication Processing Flowchart

FIG. 5 is a flowchart depicting an algorithm for indication processing that may be implemented by embodiments constructed in accordance with principles of the present invention. In block 501 a subject object in a server of a client server network is being observed by an observer object. The subject object may be one of many related objects packaged within a first provider as, for example, subject object 306 within provider 308 of FIG. 3. The observer object may likewise be one of many related objects packaged within a second provider. There is an indication manager functionally positioned between subject object and observer object which operates as discussed hereinabove. In block 502 the subject object changes state, thereby creating an indication which is detected by the observer object. In block 503 the query is posed: does the indication pass the indication filter associated with the observer object? This filtering function may be considered to be inherent to operation of the observer object if the client to the observer object which is to receive the indication from the observer object is also running in the same common process space in which the observer object is running, (e.g. both running under the same CIMOM). In the event that is not the case, if the answer to the query is "no", there is no client interested in the state change of the subject object and the algorithmic process stops. But, if the answer to the query is "yes", then in block 504 the indication is forwarded to the network client(s) indication manager running under CIMOM which is running on the server. (The indication is ultimately intended for one or more network clients which have subscribed to this indication and therefore it must first be processed by indication manager 305.)

The algorithmic process moves to decision block 505 wherein a query is posed: for each client that registered for indications in the server on the subject object, does the indication pass that client's filter (the filter for that client that is established under the server's CIMOM)? On the one hand, if "no", the algorithmic process moves to query block 506 wherein another query is made: is that the last client whose filter is to be investigated? If not, the investigation of the next client and next filter is undertaken again in block 505; but, if yes, then the algorithmic process concludes with no network client having subscribed to this particular indication. On the other hand, if the answer to the question in query block 505 is "yes", the algorithmic process moves to query block 508 wherein a still another query is posed: is the heartbeating activity functioning properly? This query brings into this algorithmic process of FIG. 5 the entire heartbeating algorithm depicted in FIGS. 7A and 7B. If there is something in the client server network operation that causes the heartbeating algorithm to reflect a client or server failure, then the answer to the query in block 508 is "no" and the indication processing algorithm moves to block 509 wherein action per heartbeat polling is taken after which the algorithm of FIG. 5 concludes. But, if the heartbeat is ok, then the answer to the query posed in block 508 is "yes" and the process moves to block 507 wherein the indication manager running under CIMOM sends the indication to the client by way of an ordinary TCP/IP connection or a persistent pipe and the algorithm concludes.

FIG. 6—Establishing Persistent Pipe Flowchart

FIG. 6 is a flowchart depicting an algorithm for the establishment of a persistent pipe which may be implemented by embodiments constructed in accordance with principles of the present invention. In block 601 the client establishes a TCP/IP connection to the server. In other words, this is a standard TCP/IP connection that can be established by any client with any server in the network in accordance with standard Internet protocol. For example, in FIG. 2 or 3, this connection is undertaken via data and XML requests link 207. In block 602 the client issues a "Request Notification Channel" request over that standard connection to the server by forwarding the client's triplet address identifier (including client's TCP/IP address, bound port number, and session ID number) to the server. In block 603 the query is posed: is the request successful? If not, a failure flag is issued in block 607 and the algorithmic process loops back to block 601. But, if yes, then the process moves to block 604 wherein the server responds to the request with a success note including the server's session ID number. For example, in FIG. 2 or 3, this is returned via the same data and XML requests link 207.

Next, in block 605, the server holds onto the connection made by the client and associates the connection with the client's triplet. For example, in FIG. 2 or 3, this essentially establishes the connection between server 202 and the server end of pipe 205, 303, or 304, depending upon which client's triplet is involved. Thereafter the algorithmic process moves to block 606 wherein the client holds onto the connection and associates it with this server's IP address and this server's returned session ID number. For example, in FIG. 2 or 3, this essentially establishes the connection between clients 201, 301, or 302 and the client end of pipe 205, 303, or 304 respectively, again depending upon which client's triplet is involved, whereupon that pipe is persistent. The process of making persistent connections on both ends of the pipe may be virtually instantaneous rather than sequential. After that the algorithm concludes with respect to the pipe that has been made persistent.

FIGS. 7A–7B—Flowcharts—Heartbeat Polling

FIGS. 7A and 7B are interconnected flowcharts depicting an algorithm for heartbeat polling which may be implemented by embodiments constructed in accordance with principles of the present invention. In block 701 the client sends a polling heartbeat (triplet) to the server, for example, over line 206A in FIG. 3. In decision block 702 the query is posed: is the time interval between the last most previous heartbeat and this heartbeat short enough to reset the timer in the server?

On the one hand, if "no", the algorithmic process moves to FIG. 7B, tab "A", where the server makes the assumption in block 710 that the client has failed. This assumption is based on not receiving a heartbeat from the client in a specified time from the last heartbeat. The client may or may not have failed—for example, a connection merely may have been broken. Next, in block 712, to preserve server resources, the network client's indication manager (e.g., 305) finds and removes all indication subscriptions made by the client that reside in the CIMOM on the server and in the server's providers. Thereafter, in decision block 713 the query is posed: is the pipe persistent? If not, the algorithmic process moves to block 715 where the server waits. The client may revive and re-subscribe to indications or there may be a subscription for indications by a new client, after which the process concludes. The responsibility is upon a client to connect or re-connect to the server, and the server simply waits for that connection. However, if the pipe is persistent, the process moves from decision block 713 to block 714 wherein the indication manager controls the removal of the persistent connection to the failed client from the list of connections to be monitored and destroys the persistent connection. For example, this would be reflected in FIG. 3 by the dismantling of pipe 205 by module 314 responsive to module 312 under control of indication manager 305. Thereafter, in block 715, the server again waits. The client may revive or there may be a subscription for indications by a new client, after which the process concludes. Again, the responsibility is upon a client to connect or re-connect to the server and the server simply waits for that to happen.

On the other hand, if "yes", if the time interval is short enough to reset the timer in the server, the algorithmic process moves from decision block 702 to decision block 703 wherein the query is posed: has the client's session ID# changed? If "yes" the algorithmic process again moves to FIG. 7B, this time to tab "B". In block 711 the server knows that the client has recycled (turned from "on" to "off" and back to "on") because a different session ID# cannot be obtained unless such recycling has taken place. Thereafter the algorithmic process moves to block 712 and follows the same steps as earlier presented for blocks 712, 713, 714, and 715, whereafter the algorithm concludes.

Returning to decision block 703, if the answer is "no" then client's session ID# has not changed and there is no notification at this point that the client may have failed. Accordingly, in block 704 the server returns the server's session ID# to the client. In decision block 705 the query is posed: "has server's session ID # changed? Client makes a comparison between the server's session ID# it had earlier stored in its memory with the currently returned server ID#. If "yes", the process moves to block 706 where the client re subscribes to indications in the server. This efficient re-subscription relieves the client from expending any further resources with a server that may otherwise have produced erroneous results. Thereafter, in decision block 707 the query is posed: is the re-subscription successful? If "no", there may be a series of re-attempts at re-subscription as suggested by the dotted loop back to block 706. Otherwise, the process moves to block 709 where the client selects a different server or client-server operation stops and the algorithm is concluded.

However, if the re-subscription is successful the process moves from block 707 to block 708 where the client-server operation continues, after which the algorithmic process concludes. And, returning to decision block 705, if the server's session ID# had not changed, signifying that the server has not recycled, the process moves directly to block 708 where the client server operation continues, after which the algorithmic process concludes.

The present embodiments are to be considered in all respects as illustrative and not restrictive. The requests need not be written in XML but could be written in any other suitable object-oriented, text-based computer language. The client and server CIMOM and other code need not be written in JAVA and C++ respectively, but could be written in any other suitable object-oriented high level computer language compatible with the selected text-based language. The software need not be housed on the client or server, but could be housed in a dedicated server or possibly on the user interface itself The present invention is applicable wherever a client-server network is used and is not limited to storage system servers or networks.

The method, system, and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a general purpose computer or processor, the machine becomes an apparatus for practicing the invention because the program code combines with the machine to provide a unique apparatus that operates analogously to operation of specific logic circuits. Methods and apparatus of the present invention may also be embodied in forms of program code that are transmitted over a transmission medium, such as over electrical wiring or cabling, through fiber optics, or via any other transmission medium.

Moreover, the flowcharts used herein to demonstrate various aspects of the invention should not be construed to limit the present invention to any particular logic flow or logic implementation. The described logic may be partitioned into different logic blocks, (e.g., programs, modules, functions, or subroutines) without changing the overall results or otherwise departing from the true scope of the invention. The present invention may be embodied in many different forms, including, but not limited to, computer program logic for use with any kind of processor, programmable logic for use with any kind of programmable logic device, discrete components, integrated circuitry including application specific integrated circuits (ASICs), or any other means including any combination thereof. Computer program logic implementing all or part of the functionality described herein may be embodied in various forms, including, but not limited to, source code form, computer executable form, and various intermediate forms (e.g. forms generated by an assembler, compiler, linker, or locator.) Source code may include a series of computer program instructions implemented in any of various programming languages for use with various operating systems or operating environments. The source code may define and use various data structures and communication messages. The source code may be in computer executable form, or it may be in a form convertible into computer executable form. The computer program may be fixed in any form either permanently or transitorily in a tangible storage medium, such as a semi-conductor memory device, a magnetic memory device, an optical memory device, a PC card, or other memory device. The computer program may be fixed in any form in a signal that is transmittable to a computer using any of various communication technologies including, but not limited to, analog, digital, optical, wireless, networking, and internetworking technologies. The computer program may be distributed in any form as a removable storage medium with accompanying printed or electronic documentation, pre-loaded with a computer system (e.g. on system ROM or fixed disk), or distributed from a server or electronic bulletin board over the communication system (e.g., the Internet or World Wide Web).

Therefore, the scope of the invention is indicated by the appended claims rather than by the foregoing description, and all changes which come within the meaning and range of equivalency of the claims are therefore intended to be embraced therein.

What is claimed is:

1. A method for monitoring certain objects in a client server network comprising:
    establishing indication subscriptions for observing each one of said certain objects;
    providing an indication when said each one of said certain objects changes state;
    subjecting said indication to an indication filter to obtain a filtered indication;
    forwarding said filtered indication to an indication manager if said filtered indication is obtained;
    if said network includes multiple clients, determining which of said clients registered for said filtered indication to obtain registered clients;
    connecting each of said registered clients and said server with a persistent connection therebetween;
    heartbeat polling to determine if both said registered clients and said server are functioning properly;
    responsive to said heartbeat polling, providing to said client a server ID number which changes to a different server ID number each time said server recycles and providing a client ID number which changes to a different client ID number only after said client has recycled;
    responsive to said different server ID number, re-establishing any of said indication subscriptions which were lost if said server has recycled; and
    if said server is functioning properly, forwarding said filtered indication to each of said registered clients that is functioning properly over said persistent connection.

2. A computer program product for use in a client server network having a plurality of objects, said computer program product configured to run on said client and/or said server, said computer product including a tangible computer usable medium having computer readable program code thereon for monitoring certain of said objects, said program code comprising:
    program code for establishing indication subscriptions for observing each one of said certain objects;
    program code for providing an indication when said each one of said certain objects changes state;
    program code for subjecting said indication to an indication filter to obtain a filtered indication;
    program code for forwarding said filtered indication to an indication manager;
    if said network includes multiple clients, program code for determining which of said clients registered for said filtered indication to obtain registered clients;
    program code for connecting each of said registered clients and said server with a persistent connection therebetween;
    program code for heartbeat polling to determine if both said registered clients and said server are functioning properly;
    program code, responsive to said heartbeat polling, for providing to said client a server ID number which changes to a different server ID number each time said server recycles and for providing a client ID number which changes to a different client ID number only after said client has recycled;
    program code, responsive to said different server ID number, for re-establishing any of said indication subscriptions which were lost if said server has recycled; and
    said indication manager including program code for forwarding said filtered indication to each of said registered clients that is functioning properly over said persistent connection if said server is functioning properly.

3. A computer program product for use in a client-server network having at least one client and at least one server with a plurality of objects, said computer program product including a tangible computer usable medium having computer readable program code thereon for monitoring the state of at least certain of said objects, said program code comprising:
    program code for establishing an indication subscription for each one of said certain of said objects;
    each said indication subscription including program code for providing an indication when its respective object changes state;
    said indication providing program code including:
        program code for determining which said at least one client has subscribed to said indication from said respective object and
        program code for forwarding said indication to said which said at least one client over a persistent pipe connection between said which said at least one client and said at least one server; and,
    heartbeat polling program code for periodically determining that both said client and said server are fully operational and thereby determining that said indication subscription establishing program code and said indication providing program code are also fully operational;
    said heartbeat polling program code including:
        program code for providing to said client a server ID number which changes to a different server ID number each time said server recycles and for providing a client ID number which changes to a different client ID number only after said client has recycled; and
        program code, responsive to said different server ID number, for re-establishing any of said indication subscriptions which were lost if said server has recycled.

4. The computer program product of claim 3 wherein said indication subscription establishing program code comprises:
    XML program code for communicating from said client to said server over connections between said at least one client and said at least one server.

5. The computer program product of claim 4 wherein said connections are TCP/IP connections.

6. The computer program product of claim 3 wherein said heartbeat polling program code comprises:

program code for forwarding a triplet consisting of its TCP/IP address, bound port number, and session ID# from said at least one client to said at least one server; and, program code for responding to said triplet by forwarding its session ID# from said at least one server to said at least one client.

7. The computer program product of claim 3 wherein said heartbeat polling program code comprises:

program code for forwarding from said client to said server a periodic polling triplet identifier at an identifier interval settable by said client;

program code for resetting an interval timer in said server if said identifier interval between said identifier and a next successive identifier is less than the timer interval, thereby indicating operability of said client;

program code for enabling said client to detect each occurrence of failure and return of said server during said identifier interval; and program code for enabling said server to detect each occurrence of failure and return of said client during said identifier interval.

8. In a client-server network having a plurality of objects, a computer program product capable of running on said client and/or said server, said computer program product including a tangible computer usable medium having computer readable program code thereon for monitoring the state of said objects, said program code comprising:

program code for establishing a persistent connection between said client and said server;

program code for establishing indication subscriptions for monitoring certain of said plurality of objects;

program code for firing back an indication from each one of said certain of said plurality of objects in said server through said connection from said server to said client when said each one of said certain of said plurality of objects in said server changes state;

said client including program code for periodically polling said server to determine overall operational status of said indication subscriptions establishing program code and said indication firing back program code, and to permit said server to determine if said client is functioning;

program code, operable with said polling program code, for providing a client ID number which changes to a different client ID number only after said client has recycled;

program code, responsive to operation of said periodic polling program code, for providing to said client a server ID number which was changed to a different server ID number each time said server was recycled; and, program code, responsive to said different server ID number, for re-establishing any of said indication subscriptions which were lost because said server has recycled.

9. The computer program product of claim 8 wherein said network operates over the Internet and is protected by at least one firewall, said computer program product further comprising:

program code for enabling said persistent connection to tunnel through said at least one firewall between said client and said server by granting a bound port at said client and another bound port at said server and by mutually exchanging identification numbers of said bound port and said another bound port between said client and said server.

10. In a client-server network having at least one client and at least one server with a plurality of objects, a method for monitoring the state of at least certain of said objects comprising:

establishing an indication subscription for each one of said certain of said objects;

providing an indication when its respective object changes state said indication providing including:

determining which said at least one client has subscribed to said indication from said respective object and forwarding said indication to said which said at least one client over a persistent pipe connection between said which said at least one client and said at least one server; and, periodically determining that both said client and said server are fully operational and thereby determining that said indication subscription establishing and said indication providing are also fully operational;

said periodically determining including:

providing to said client a server ID number which changes to a different server ID number each time said server recycles and providing a client ID number which changes to a different client ID number only after said client has recycled: and responsive to said different server ID number, re-establishing any of said indication subscriptions which were lost if said server has recycled.

11. The method of claim 10 wherein said indication subscription establishing comprises:

communicating in XML from said client to said server over connections between said at least one client and said at least one server.

12. The method of claim 11 wherein said connections are TCP/IP connections.

13. The method of claim 10 wherein said periodic determining comprises:

said at least one client forwarding a triplet consisting of its TCP/IP address, bound port number, and session ID# to said at least one server; and, said at least one server responding to said triplet by forwarding its session ID# to said at least one client.

14. The method of claim 10 wherein said periodic determining comprises:

forwarding from said client to said server a periodic polling triplet identifier at an identifier interval settable by said client;

resetting an interval timer in said server if said identifier interval between said identifier and a next successive identifier is less than the timer interval, thereby indicating operability of said client;

enabling said client to detect each occurrence of failure and return of said server during said identifier interval; and enabling said server to detect each occurrence of failure and return of said client during said identifier interval.

15. In a client-server network having a plurality of objects, a method for monitoring the state of said objects comprising:

establishing a persistent connection between said client and said server;

establishing indication subscriptions for monitoring certain of said plurality of objects;

firing back an indication from each one of said certain of said plurality of objects in said server through said connection from said server to said client when said each one of said certain of said plurality of objects in said server changes state;

periodically polling said server to determine overall operational status of said indication subscriptions establishing and said indication firing back, and to permit said server to determine if said client is functioning;

responsive to operation of said periodic polling, providing to said client a server ID number which was changed to a different server ID number each time said server was recycled and providing a client ID number which changes to a different client ID number only after said client has recycled; and re-establishing any of said indication subscriptions which were lost because said server has recycled, responsive to providing said different server ID number.

16. The method of claim 15 wherein said network operates over the Internet and is protected by at least one firewall, said method further comprising:

enabling said persistent connection to tunnel through said at least one firewall between said client and said server by granting a bound port at said client and another bound port at said server and by mutually exchanging identification numbers of said bound port and said another bound port between said client and said server.

17. The method of claim 15 comprising:

dismantling client-resources dedicated to said server if said different server ID number is provided; and, dismantling server-resources dedicated to said client if said different client ID number is provided.

18. In a client-server network having at least one client and at least one server with a plurality of objects, a system for monitoring the state of at least certain of said objects comprising:

means for establishing an indication subscription for each one of said certain of said objects;

each said indication subscription including means for providing an indication when its respective object changes state;

said indication providing means including:

means for determining which said at least one client has subscribed to said indication from said respective object and means for forwarding said indication to said which said at least one client over a persistent pipe connection between said which said at least one client and said at least one server; and, heartbeat polling means for periodically determining that both said server and said client are fully operational and thereby determining that said indication subscription establishing means and said indication providing means are also fully operational;

said heartbeat polling means including:

means for providing to said client a server ID number which changes to a different server ID number each time said server recycles and for providing a client ID number which changes to a different client ID number only after said client has recycled; and means, responsive to said different server ID number, for re-establishing any of said indication subscriptions which were lost if said server has recycled.

19. The system of claim 18 wherein said indication subscription establishing means comprises:

connections between said at least one client and said at least one server;

means for communicating particular XML code from said client to said server over said connections.

20. The system of claim 19 wherein said connections are TCP/IP connections.

21. The system of claim 18 wherein said heartbeat polling means comprises:

said at least one client forwarding a triplet consisting of its TCP/IP address, bound port number, and session ID# to said at least one server; and, said at least one server responding to said triplet by forwarding its session ID# to said at least one client.

22. The system of claim 18 wherein said heartbeat polling means comprises:

means for forwarding from said client to said server a periodic polling triplet identifier at an identifier interval settable by said client;

means for resetting an interval timer in said server if said identifier interval between said identifier and a next successive identifier is less than the timer interval, thereby indicating operability of said client;

means for enabling said client to detect each occurrence of failure and return of said server during said identifier interval; and means for enabling said server to detect each occurrence of failure and return of said client during said identifier interval.

23. In a client-server network having a plurality of objects, a system for monitoring the state of said objects comprising:

system component for establishing a persistent connection between said client and said server;

system component for establishing indication subscriptions for monitoring certain of said plurality of objects;

system component for firing back an indication from each one of said certain of said plurality of objects in said server through said connection from said server to said client when said each one of said certain of said plurality of objects in said server changes state;

said client including system component for periodically polling said server to determine overall operational status of said indication subscriptions establishing system component and said indication firing back system component, and to permit said server to determine if said client is functioning;

system component, responsive to each operation of said periodic polling system component, for providing to said client a server ID number which was changed to a different server ID number each time said server was recycled and for providing a client ID number which changes to a different client ID number only after said client has recycled; and, system component, responsive to operation of said server ID number providing system component providing said different server ID number, for re-establishing any of said indication subscriptions which were lost because said server has recycled.

24. The system of claim 23 wherein said network operates over the Internet and is protected by at least one firewall, said system further comprising:

system component for enabling said persistent connection to tunnel through said at least one firewall between said client and said server by granting a bound port at said client and another bound port at said server and by mutually exchanging identification numbers of said bound port and said another bound port between said client and said server.

25. In a client-server network having at least one client and at least one server with a plurality of objects, apparatus for monitoring the state of at least certain of said objects comprising:
- first apparatus for establishing an indication subscription for each one of said certain of said objects;
- each said indication subscription including second apparatus for providing an indication when its respective object changes state;
- said second apparatus including:
  - third apparatus for determining which said at least one client has subscribed to said indication from said respective object and
  - fourth apparatus for forwarding said indication to said which said at least one client over a persistent pipe connection between said which said at least one client and said at least one server; and,
- heartbeat polling apparatus for periodically determining that both said server and said client are fully operational and thereby determining that said indication subscription establishing apparatus and said indication providing apparatus are also fully operational;
- said heartbeat polling apparatus including:
  - fifth apparatus for providing to said client a server ID number which changes to a different server ID number each time said server recycles and for providing a client ID number which changes to a different client ID number only after said client has recycled; and
  - sixth apparatus, responsive to said different server ID number, for re-establishing any of said indication subscriptions which were lost if said server has recycled.

26. A method for monitoring certain of a plurality of objects in a client server network comprising:
- establishing indication subscriptions for providing an indication from said server to said client over a persistent connection therebetween when each of said certain objects changes state; and,
- heartbeat polling to determine if said client and said server are functioning properly said heartbeat polling including:
  - providing to said client a server ID number which changes to a different server ID number each time said server recycles and providing a client ID number which changes to a different client ID number only after said client has recycled; and
  - responsive to said different server ID number, re-establishing any of said indication subscriptions which were lost if said server has recycled.

* * * * *